R. H. BROWN.
CARTON FOLDING AND STITCHING MACHINE.
APPLICATION FILED MAR. 28, 1912.

1,076,015.

Patented Oct. 21, 1913.

R. H. BROWN.
CARTON FOLDING AND STITCHING MACHINE.
APPLICATION FILED MAR. 28, 1912.

1,076,015.

Patented Oct. 21, 1913.

R. H. BROWN.
CARTON FOLDING AND STITCHING MACHINE.
APPLICATION FILED MAR. 28, 1912.

1,076,015.

Patented Oct. 21, 1913.

UNITED STATES PATENT OFFICE.

REUBEN H. BROWN, OF NEW HAVEN, CONNECTICUT.

CARTON FOLDING AND STITCHING MACHINE.

1,076,015.　　　　　Specification of Letters Patent.　　Patented Oct. 21, 1913.

Application filed March 28, 1912. Serial No. 686,976.

*To all whom it may concern:*

Be it known that I, REUBEN H. BROWN, a citizen of the United States, residing at New Haven, in the county of New Haven and State of Connecticut, have invented certain new and useful Improvements in Carton Folding and Stitching Machines; and I do hereby declare the following to be a full, clear, and exact description of the invention, such as will enable others skilled in the art to which it appertains to make and use the same.

My invention relates to machines for folding and wire stitching cartons for paper boxes, so that they will occupy but little space in shipment.

That others skilled in the art may fully understand my invention, reference is had to the accompanying drawings wherein the same figures and letters of reference designate like parts throughout the several views.

1 is a table projecting from the machine frame 2 for supporting the mechanism for feeding the carton blanks into the folding mechanism presently to be described.

3, 4, 5 and 6 are longitudinally movable carton carrier plates slidably mounted on the table on which plates rest the cartons 7, piled one over the other. The ends of these cartons abut against the guides 8 and 9. These guides are adjustably secured to the table by the screws 10, Fig. 1. The guide 8 is adapted to be shifted into different positions to accommodate for different lengths of cartons; and for this purpose holes 11 are provided in the table. The outer edges of the neck portion *a* of the under carton are in contact with the incline front guides 12.

Figure 1:
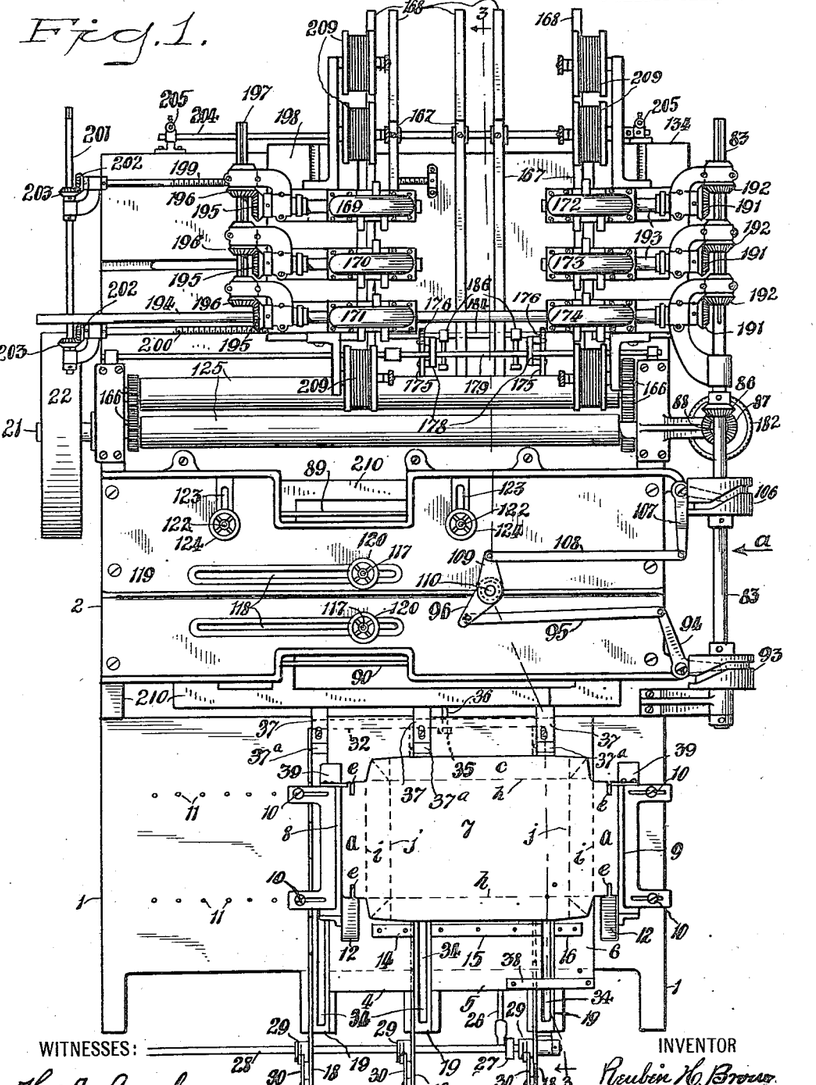
Figure 1 represents an upper plan view of the machine showing cartons before being folded or stitched.
Figures 3, 7, 8:
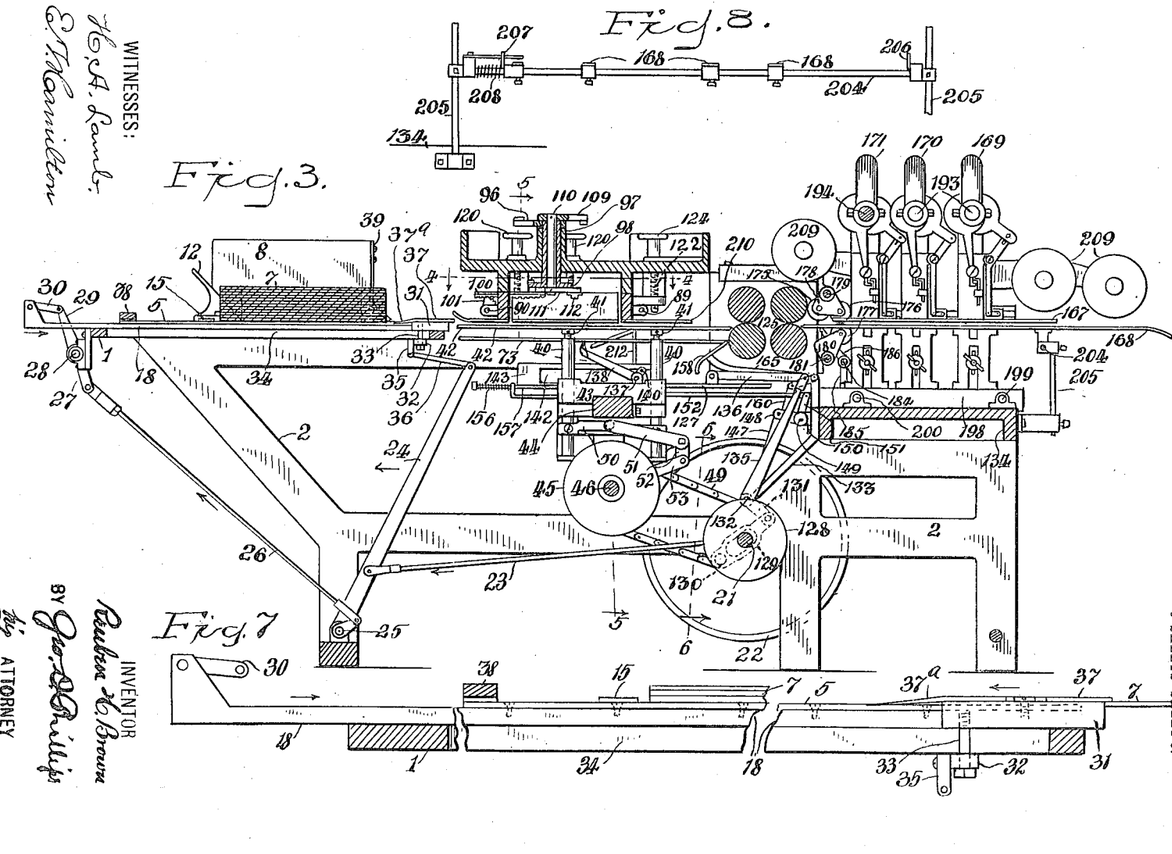
Fig. 3 is a longitudinal sectional view of the machine frame, carton feeding table, shafts and feed rolls on line 3 of Fig. 1.
Fig. 7 is an enlarged broken view of the carton feeding devices and a sectional view of the feeding table.
Fig. 8 is a detail view of the carton support located between the wire stitchers.
Figure 4:
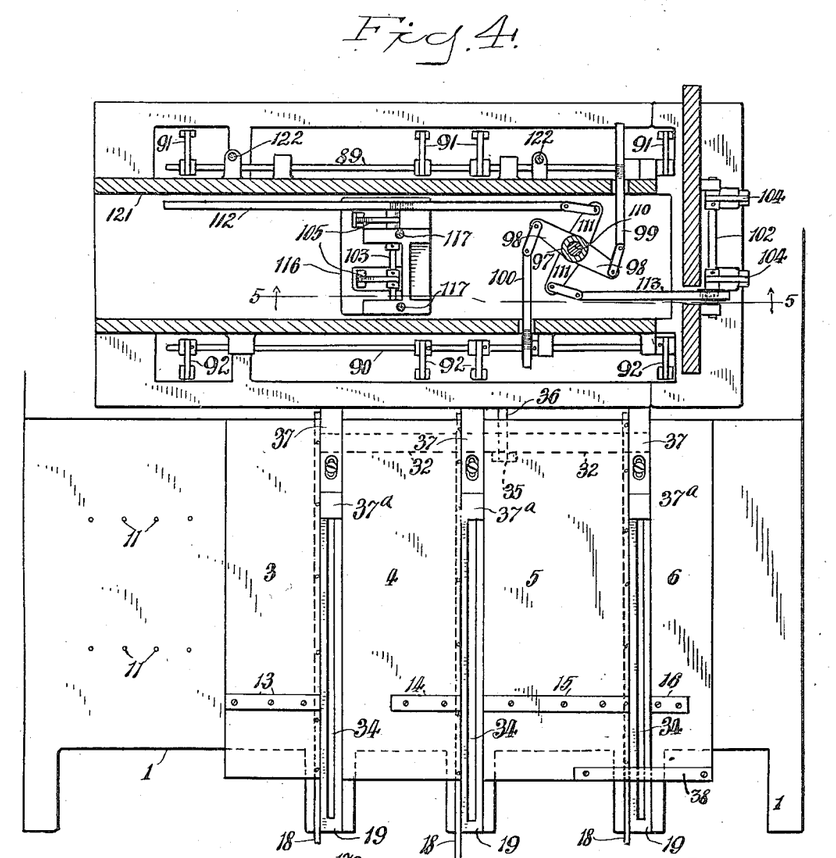
Fig. 4 is an enlarged horizontal section of the upper part of the machine frame on line 4 of Fig. 3, and an upper plan view of the carton feeding table, carton carrier plates, and broken view of the carton carrier plate pusher bars.

13, 14, 15 and 16, Figs. 1 and 4, are thin metal strips, preferably thinner than the cartons, secured to the carton carrier plates 3, 4, etc., to serve as initial injectors or carton starters for the lower carton or carton blank of the pile. These plates are attached by one edge, Fig. 11, to the pusher bars 18 located at one side of the grooves or channels 19 in the table. These bars are reciprocated through the medium of the eccentric 20, Fig. 6, mounted on the driving shaft 21 carrying the driving pulley 22. The intermediate mechanism connecting this eccentric with the pusher bars comprises the connecting rod 23, Figs. 2 and 3, lever 24 secured to the rocker shaft 25, connecting rod 26 actuated by said shaft, arms 27 and 29 secured to the rocker shaft 28, and link 30.

31 are the final carton ejectors that engage the lower carton that has been partially removed from under the pile of cartons and pushes it into the folding mechanism, presently to be described. These final ejectors are located in the grooves or channels 19 and are connected together so as to move in unison by means of the bar 32. Each ejector is secured to this bar by bolts, one of which bolts, 33, is shown at Figs. 3 and 7, projecting through the long open slots 34 seen more clearly at Fig. 4. The bar 32 has the arm 35 secured thereto and said arm is pivotally connected to the long lever 24, Fig. 3, through the medium of the link 36. Overlying each final ejector, and longitudinally adjustable thereon, are the plates 37, seen more clearly at Fig. 7. The rear portion of these plates have the incline 37$^a$ to permit the ejectors 31 to slip under the cartons on their backward stroke so as not to displace them or disturb the carton that has been partially pushed from under the pile of cartons.

The normal position of the preliminary pushers or carton starters and the carton ejectors is shown at Fig. 1, the former being close to the outer edge of the cartons. Both starters and ejectors move at the same instant and in opposite directions, but at a different rate of speed, so that, when the carton starters have advanced the bottom carton a distance equal to their forward travel, the ejectors 31 will have reached their extreme backward position, viz.: in front or outside of the cartons. As soon as this happens, the backward movement of the carton starters and the forward movement of the ejectors will occur simultaneously; the latter pushing the partially ejected carton into the field of the folding mechanism as before stated.

The distance traveled by the final ejectors, and the rate of speed at which they must necessarily move to cover this distance and achieve economical results by pushing a carton into the folding mechanism as fast as a folded carton is ejected therefrom, would preclude their use without the coöperation of the preliminary starters for the reason that as the cartons are made of heavy cardboard and cover a large area, the contact of the swift moving ejectors with the underlying carton would be in the nature of a violent blow that would break the edges of the carton before its inertia could be overcome. To counteract this unavoidable result due to the exclusive use of the final ejectors, the carton starters are moved very slowly, and as the starters are secured to the plates on which the cartons rest, it will readily be seen that the only friction to be overcome is that between the upper surface of the underlying carton and the weight of the overlying pile of cartons, as there can be no friction between the movable plates and the cartons. The carrier plates, as previously mentioned, will have advanced an underlying carton a distance sufficient to practically eliminate the friction when the ejectors are brought in contact with the advanced carton. In other words, the resistance offered by this advanced carton will be so slight that it will be easily removed without being damaged when engaged by the swift moving ejectors.

In Fig. 1 it will be observed that there are but three carton carrier plates, 4, 5 and 6, with their carton engagement strips 14, 15 and 16, due to the advanced position of the guide 8 for a comparatively short carton, while in Fig. 4 the carrier plate 3 is added for longer cartons. All of the carrier plates except 6 are attached to the push bars 18, and this plate, in order to move in unison with the other plates, is connected with plate 5 by the bridge 38 spanning the channel way 19. 39 are stops secured to the forward ends of the guides 8 and 9, which stops project into the path of the pile of cartons to prevent the pile being moved forward when the underlying carton is being ejected, but their lower ends lie above the carrier plates far enough to permit the removal of the lower carton. The travel of the carton carrier plates may be increased or decreased by simply changing the length of the link 30 or by other well known means.

Figure 2:
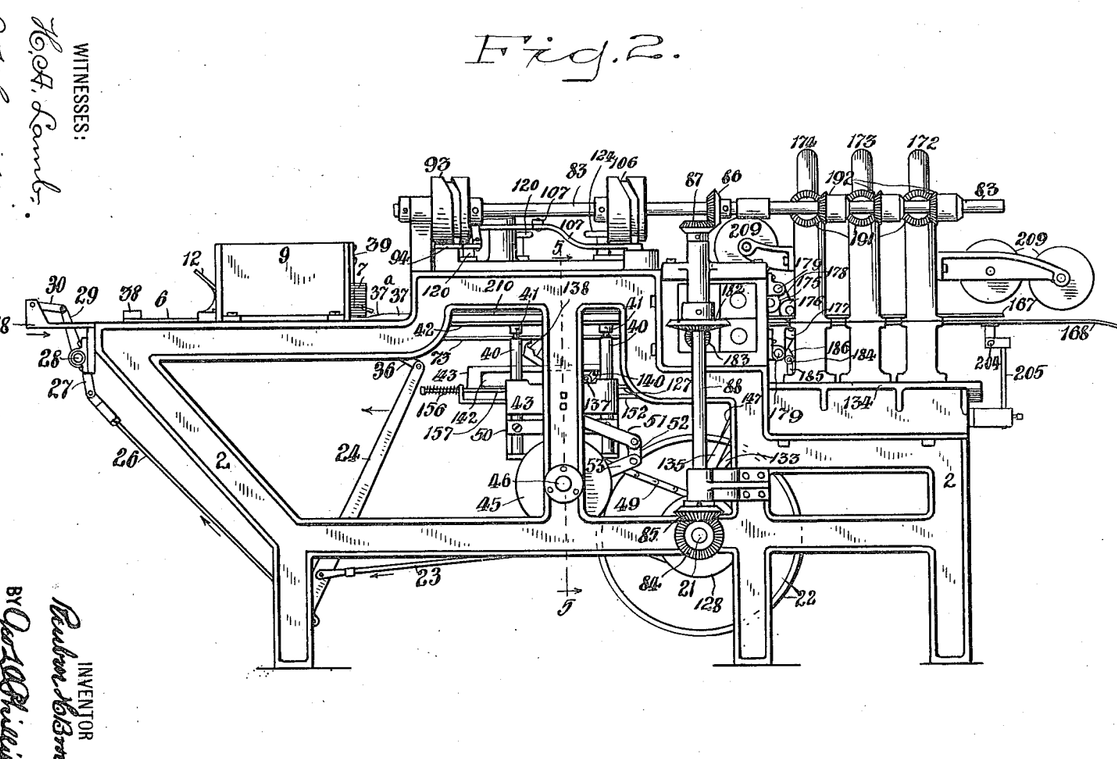
Fig. 2 is a side elevation of the machine looking in the direction of arrow *a* of Fig. 1.
Figure 5:
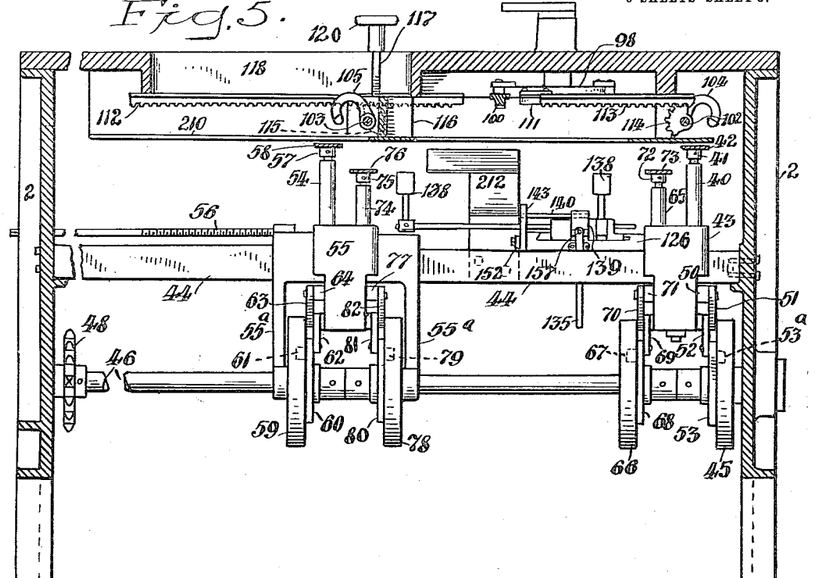
Fig. 5 is an enlarged vertical section of the upper portion of the machine and of the frame on line 5 of Fig. 3.
Figures 11, 12, 13, 14, 15:
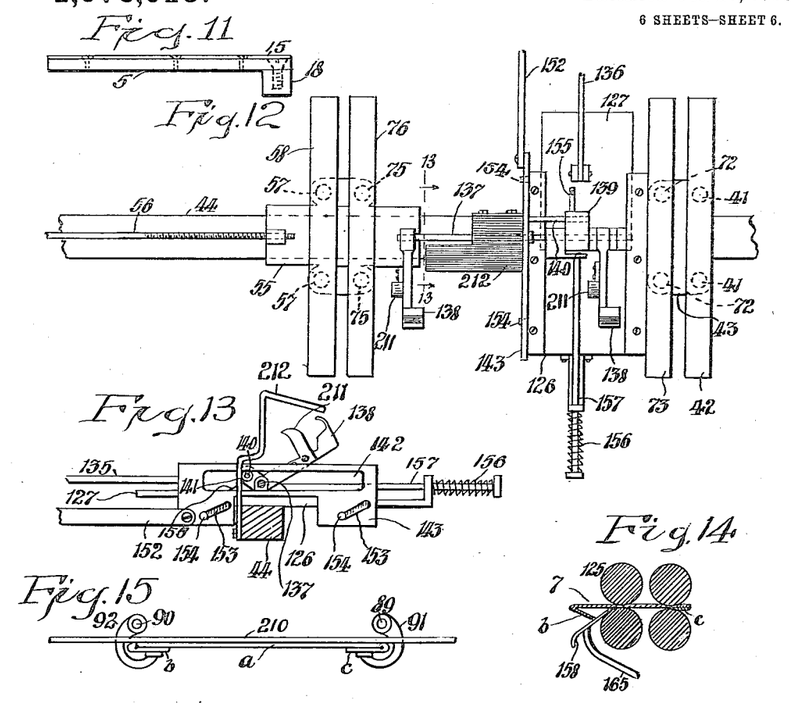
Fig. 11 is an enlarged broken detail view of one of the carton carrier plates and its pusher bar.
Fig. 12 is an enlarged partly broken upper plan view of the carton grippers, guides and ejectors.
Fig. 13 is a cross sectional view on line 13 of Fig. 12.
Fig. 14 is a cross sectional view of the combined feed and compression rolls, sectional view of a folded carton between the rolls, and broken view of the carton guide.
Fig. 15 illustrates the action of the side folders.

40, Figs. 2, 3 and 5, are vertically operating carton grippers and carton guides carrying the adjustable heads 41, seen also at Fig. 12.

42 is a metal strip secured to said heads. These grippers are reciprocated in the outer part of the frame 43 secured to the cross-bar 44, and are reciprocated by the cam 45 mounted on the shaft 46, which shaft is rotatably connected with the driving shaft 21 through the medium of the sprocket wheels 47, Fig. 6, 48, Fig. 5, and the chain 49, Fig. 2.

50 is a cross-bar connected to these two grippers, and 51, 52 are links operatively connecting this bar with the lever 53 carrying the roll 53$^a$, Fig. 5, to engage with a cam groove in the inner face of the cam 45.

54 is one of a pair of similar grippers to the ones above described and moving in unison therewith in the frame 55, which frame is adjustably mounted on the bar 44 through the medium of the screw 56 for cartons of different lengths. The depending legs 55$^a$ of said frame embrace the shaft 46. The upper ends of the last named grippers carry the adjustable heads 57, Fig. 12, to which is secured the metal strip 58. These grippers are vertically reciprocated in a manner similar to gripper 40, viz.: from the cam 59, lever 60, roll 61, links 62, 63 and bar 64.

65, Fig. 5, is one of a pair of similarly constructed devices as the carton grippers just described, which serve the purpose of supports for a folded carton and are operatively mounted in the frame 43 and vertically reciprocated from the cam 66 through the medium of roll 67, lever 68, links 69, 70, and bar 71, connected to the carton supporters. These inside supporters carry the adjustable heads 72, Fig. 12, to which is attached the metal strip 23.

Companion carton supporters moving in unison with the supporters just described are located in the adjustable frame 55, one, 74, being shown at Fig. 5. Adjustable caps 75, Fig. 12, surmount these grippers, and 76 is a metal strip secured to these caps. These latter grippers are similarly connected by the bar 77 as described for the other supporters, and are similarly reciprocated from the cam 78 through the medium of roll 79, lever 80 and links 81, 82.

83 is an upper shaft for operating the wire stitching or stapling machines and folders, presently to be described. This shaft, Fig. 2, is rotated from the driving shaft 21 through the medium of the bevel gears 84, 85, 86, 87 and the vertical shaft 88. 89 and 90, Figs. 1, 3 and 4, are rock shafts carrying the carton side folder fingers 91, 92, Fig. 4. These shafts are actuated through the medium of the cam 93, Fig. 1, bell crank lever 94, link 95 pivotally connected to said lever, and the arm 96 secured to the upper end of the sleeve 97, seen more clearly at Fig. 3. The double arm 98, Fig. 4, at the lower end of said sleeve, carries the racks 99 and 100 to mesh with toothed segments on the folder rocking shafts. One of said segments, 101, is shown at Fig. 3.

102, 103 are short rock shafts carrying the carton end folders 104, 105, seen also at Fig. 5, which are actuated by the cam 106, Fig. 1, through the medium of the bell crank lever 107, link 108 and arm 109 secured to the upper end of the short vertical rock shaft 110.

111, Fig. 4, is a double arm secured to the lower end of said shaft whose outer ends are pivotally connected to the racks 112, 113, which racks mesh with the toothed segments 114, 115, Fig. 5, on the shafts 102, 103. The rock shaft 103 is journaled to the carrier block 116, Figs. 4 and 5, which block is adjusted for different lengths of cartons and is secured in any of its adjusted positions by means of the bolts 117 projecting up through the slots 118, Fig. 1, in the top plate 119.

120 are hand wheels for securing said carrier block in place.

The plate 121, Fig. 4, to which the rock shaft 89 is operatively suspended, is likewise adjusted for cartons of different widths through the medium of the screws 122 projecting through the slots 123, Fig. 1, and said plate is secured in any of its adjusted positions by means of the hand wheels 124.

The mechanism for ejecting the folded carton into the feed and compression rolls 125 is as follows: Referring to Figs. 5, 12 and 13, 126 is a chair secured to the crossbar 44 carrying the slide 127, which slide is reciprocated from the cam 128 on the shaft 21, as follows: 129 is a yoke (see also Figs. 3 and 6) embracing said shaft carrying at its lower end the cam roll 130. The upper end of this yoke is pivoted to the arm 131 of the short shaft 132 journaled in the hanger 133 secured to the vertical face of the bed part of the frame 134 supporting the wire stapling machines, presently to be described. 135 is a vertical lever supported on the opposite end of said shaft carrying the horizontal link 136 connecting said lever with slide 127. 137 (see also Figs. 12 and 13) is a rod journaled in the inner end of this slide carrying the ejectors 138. 139 is an arm secured to this rod carrying the pin 140 on the end of which is the roll 141 projecting into the slot 142 of the slide bar 143, where it is normally held against the upper wall of said slot. This bar bears against the inner vertical face of the chair 126 and is operated independently of the slide 127 as follows: 144 is a cam on the shaft 21, Fig. 6, engaging the roll 145 carried by the yoke 146. 147 is a vertical rod connecting the yoke with the arm 148 secured to the short shaft 149 journaled in the bracket 150. 151 is an arm on the opposite end of this shaft carrying the horizontal link 152 connecting said arm with the slide-bar 143 as shown at Figs. 12 and 13. This bar has a vertical as well as a longitudinal movement by reason of the cam slots 153 combined with the pins 154 projecting from the chair 126, as follows: As soon as the side and end folds of the carton have been made, the slide 127 will have advanced toward the folding table far enough for the ejectors 138 to engage the outer folded side of the carton when the movement of the slide bar in the opposite direction will depress said slide and elevate said ejectors into the path of the folded carton. The return movement of the ejector carrying slide will carry the folded carton into the grip of the before mentioned rolls 125. As soon as this is effected, the slide bar 143 will be longitudinally moved and elevated by the engagement of the cam slots 153 with the pins 154, as before mentioned. The spring 155, engaging the underside of the arm 139, will bring the roll 141 again in contact with upper wall of the slot 142, and also depress the ejectors 138 out of the way of an incoming carton to be folded. The spring 156 on rod 157 serves as cushion to counteract the sudden stoppage of the rapidly moving slide as a folded carton is ejected into the rolls.

158, Figs. 3 and 14, is a guide plate adapted to prevent the unsupported central portion of the folded outer flap $b$ of the carton catching against the lower roll so as to obstruct its free passage through the rolls.

During the folding operation, this guide plate is in the position shown at Fig. 3, but when a carton has been carried into the bite of the rolls by the ejector 138 as before mentioned, it will be carried up into the position shown at Fig. 14, and when the edge of the flap *b* contacts with the inclined face of the guide plate, said flap will be folded up against the underside of the body portion of the carton and maintained in that position by said plate as it enters the first pair of rolls. The pressure of these rolls will have set this flap so firmly against the body of the carton that it will remain in that closed position when it enters the second pair of rolls. The mechanism for actuating this guide comprises the cam 159, Fig. 6, vertical lever 160 carrying the cam roll 161, short shaft 162 journaled in the bracket 163, arm 164 on said shaft to which is pivoted the upper end of lever 160. The arm 165 on the opposite end of said shaft carries the guide plate 158.

The upper rolls of the series of four rolls indicated by the numeral 125 are operatively connected together by the gears 166, Fig. 1, and the lower pair of rolls are also similarly connected to each other and to the upper pair by gears (not shown), so that all four rolls will rotate in unison.

Figure 9:
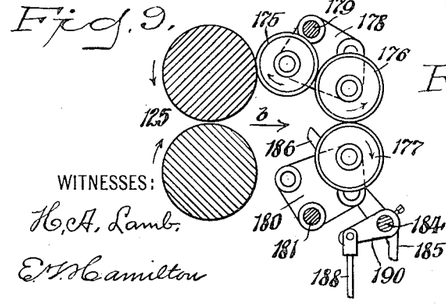
Fig. 9 is an enlarged cross sectional view of the carton feed and compression rolls, and a side elevation of the auxiliary carton feed rolls.
Figure 10:
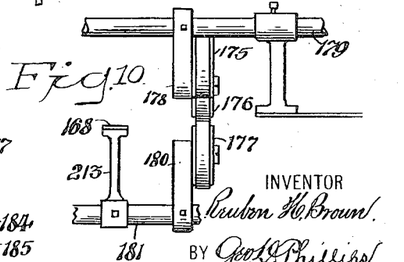
Fig. 10 is an enlarged broken side elevation of a part of the auxiliary feed roll mechanism looking in the direction of arrow *b* of Fig. 9.

A folded carton is delivered by the four rolls, just described, between the metal strips 167, 168, Figs. 1, 2 and 3, located between the two groups of opposed wire stitching machines 169, 170, 171 and 172, 173, 174. As these rolls cannot advance a carton far enough, the auxiliary rubber banded rolls 175, 176, 177, Figs. 9 and 10, are employed to advance the carton to a position a little short of the position required for the wire stitching machines to operate. The roll 175 is driven by frictional contact with one of the four compression rolls as shown, and the roll 176 from frictional contact with the roll 175, and the lower roll 177 by the frictional contact with the roll 176 or a carton therebetween. The upper pair of these rolls are journaled on the plate 178 mounted on the shaft 179 (see also Figs. 1, 2 and 3), and the lower roll is journaled on the plate 180 mounted on the shaft 181. The group of four rolls, 125, is driven, Fig. 2, from the vertical shaft 88 through the medium of the gears 182, 183.

Figures 16, 17, 18, 19:
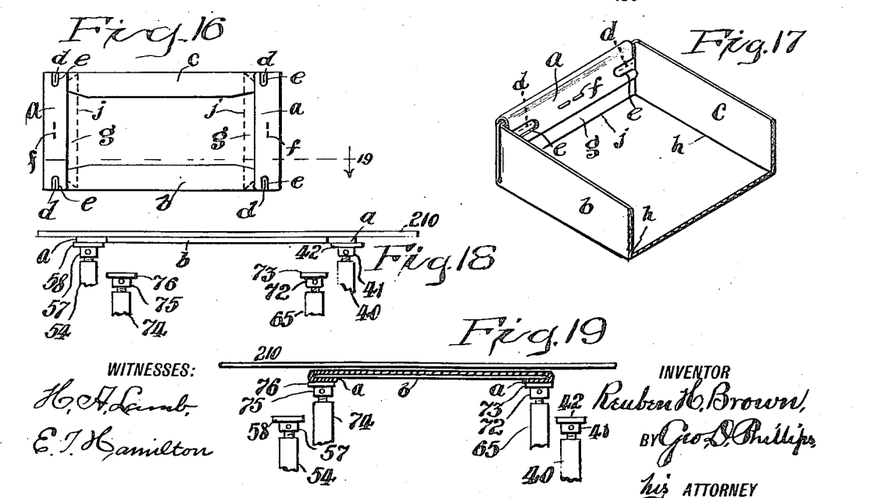
Fig. 16 is a view of a folded and stitched carton.
Fig. 17 is a sectional view of one end of a box made from a folded and stitched carton.
Fig. 18 is a broken view of the carton grippers, carton guides showing their position before the side folders are brought into operation.
Fig. 19 is a broken view of the carton grippers and carton guides, showing their respective positions after the folding is completed, and sectional view of the folded carton on line 19 of Fig. 18.

As the friction driven rolls 175, etc., are liable at times to slip a trifle, they can only be depended on to approximately place the carton preferably a trifle short of its ultimate or final position for stitching. The importance of accurately placing a carton in such position is due to the fact that the wire staples *d*, Fig. 16, for fastening the corners of the carton together, must be located within the slots *e* of the end flaps *a*. Therefore, extreme accuracy is required in locating the carton, so that the staple is not passed through the said flaps. The exact location of the staples *f* is not so important as they merely fasten the center of the flaps *a* with the turned up ends *g* of the box, as shown at Fig. 17.

Figure 6:
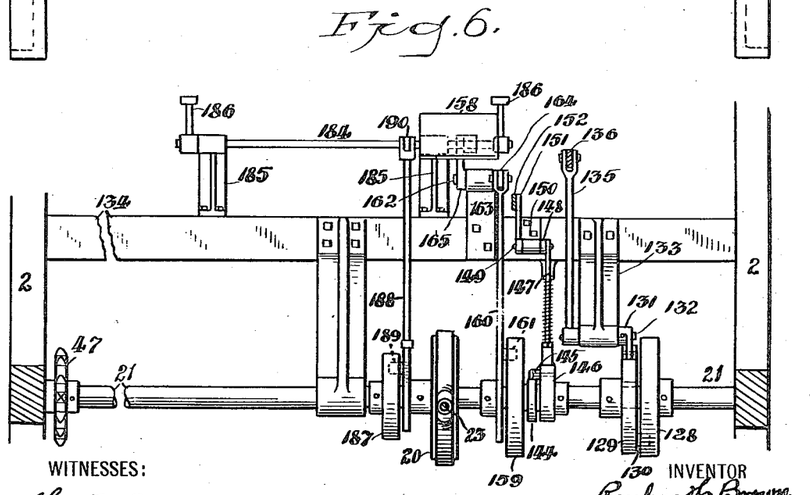
Fig. 6 is an enlarged broken sectional view on line 6 of Fig. 3.

The mechanism for the final and accurate location of the cartons with respect to the stitching machines is shown at Figs. 1, 2, 3, 6 and 9, but more clearly at Fig. 6, wherein 184 is a rock shaft journaled in the standards 185. 186 are the carton locators or fingers mounted on said shaft, which shaft is oscillated from the cam 187 through the connecting mechanism comprising the vertical rod 188, cam roll 189 and arm 190 connecting the shaft 184 with said vertical rod. When, therefore, the before mentioned friction rolls have left a carton a trifle short of its final position, the fingers 186 will advance it a trifle farther to bring it into the correct position for the stitching operation. As these finger or carton locators are positively actuated from a cam, it is quite evident that every carton must be moved an exact distance.

The wire stitching machines may be of any particular construction adapted for the purpose described. 172, 173 and 174 are located on the bed extension 134 and are driven from the shaft 83 through the medium of the bevel gears 191, 192, and the short shafts 193 and the long shaft 194. The stitchers 172 and 173 are adapted to be adjusted to and from the stitcher 174 to accommodate for different widths of cartons. The stitchers 169, 170 and 171 are driven from the long cross shaft 194, bevel gears 195, 196, and the short shaft 197. These last named stitchers are mounted on the base 198 (see also Fig. 3) and are adjustable thereon and for the same purpose as the first named stitchers. The base 198 has an adjustment to and from these first named stitchers to accommodate for cartons of different lengths. The adjustment of this base is effected by means of the threaded rods 199 and 200 engaging threaded holes in said base. These threaded rods are operated from the shaft 201 and bevel gears 202, 203.

When the folded carton is deposited upon the metal strips 168 secured to the rod 204, Figs. 1 and 8, which rod is adjustably secured on the uprights 205, the ends of the carton are brought against the stationary guide 206, and the spring actuated guide 207; the latter being under the influence of the spring 208 will exert sufficient pressure on the edge of a carton to prevent its shifting while being stitched, but not enough pressure to prevent a stitched carton being ejected from the machine by an incoming carton to be stitched.

The spools 209 contain the wire for the stitchers.

Operation: Previous to the ejection of a carton from the table by the ejectors 31, the carton grippers 40 and 54 will have been elevated to bring their metal strips 42 and 58 in as close proximity to the overlying stationary plate 210, Fig. 3, as will permit the free entrance of a carton between said overlying plate and the gripper strips, in which position the grippers serve both as a support and guide for the carton. When the carton has been fully delivered into the proper position for folding, the said grippers will advance upward and bring their metal strips forcibly against the end flaps $a$ and grip them firmly against the stationary plate as shown at Fig. 18. While the carton is thus held by the grippers, the side folders 91, 92, will operate to turn over the side flaps $b$ $c$ on the dotted lines $h$, shown at Fig. 1. When these side flaps have been folded over upon the body portion of the carton, Fig. 15, the folders will remain in that position so as to hold the carton firmly in place, while the end folders, 104, 105, turn the end flaps $a$, on lines $i$, Fig. 1, over onto the side flaps as shown at Fig. 16, pressing them firmly thereagainst. This done, these end folders will retreat, and as soon as they have cleared the folded carton, the carton supporting guide rods 65 and 74 will have been carried up far enough to bring their metal strips 73 and 76 in such close proximity to the folded flaps as to prevent their opening and also serve as a support for the folded carton, but not close enough to interfere with the free movement of the carton toward the combined pressure and feed rollers 125. As soon as the folding operation has been completed, the slide 127, Figs. 3, 12 and 13, will have placed the ejectors 138 in the rear of the folded carton when they will instantly be elevated by the downward movement of the slide bar 143 in readiness to engage the outer edge of the folded carton and force the same into the bite of the rolls 125 on the forward movement of the slide 127. The instant this is accomplished, the carton supporting guide rods 65 and 74 will retreat and the grippers 40 and 54 will simultaneously advance toward the stationary plate 210 in readiness to support the next incoming unfolded carton. As before mentioned, the folded carton being supported at the ends while resting on the metal strips 73 and 76, the unsupported central portion of the long folded side flaps $b$ $c$ are liable to drop or open. This drop is of no consequence as regards the front flap $c$, as its open mouth is away from the rolls, but the rear flap $b$, with its mouth toward the rolls, is in a measure held up by the fingers 211, Fig. 13, carried by the ejectors 138, and also by its contact with the stationary guide 212 just before the final movable guide plate 158, Fig. 14, is placed in position as shown. The pressure of the rolls will set the folded flaps in such closed position that they will remain closed on the passage of the carton from said rolls to the stitchers. When the cartons leave the stitchers, they will be in the condition shown at Fig. 16, having an average thickness of only three times the thickness of the carton before folding.

While the machine above described is adapted to fold and stitch cartons of comparatively small size, it is particularly intended and adapted for cartons from which very large shipping boxes are made. The cartons are first creased on the lines $h$ $i$ $j$, Fig. 1. The lines $h$ $i$ as before mentioned, form the bending points of the side and end flaps, and are the only points taken into consideration by this machine; the carton forming no part of my invention. When the flat carton is to be converted into a box, the folded ends $a$ are erected from the lines $j$, Figs. 1 and 17, and the flaps $b$ $c$ are also erected to form the sides of the box. Heretofore, boxes were shipped in the condition shown at Fig. 17, which not only resulted in considerable loss by reason of the unprotected sides and ends being broken and otherwise damaged by handling in transit or packing, but the room the boxes occupied greatly increased transportation charges. But in shipping or storing the cartons in the condition as shown at Fig. 16, it will readily be seen that the closer they are packed the better they are protected, and a far greater number can be packed in a given space than by the old method of shipping or packing the boxes.

Having thus described my invention, what I claim is:—

1. The combination in a machine of the character described comprising a carton supporting table, carton feeding mechanism, carton folding mechanism, and carton stitching mechanism, arranged in serial order to feed a carton blank from the table to the folders, fold the ends and sides down upon the main body portion, of the carton and advance the folded carton to the stitching mechanism and stitch said carton while folded.

2. In a machine of the character described, side and end folders, mechanism for alternately actuating said folders, vertically movable carton grippers adapted to guide and support a carton until it is in a position for folding and then grip and hold the carton while the side folders operate, said side folders adapted to remain in closed position against the folded sides of the carton during the operation of the end folders, means for retreating the grippers prior to the action of said end folders, vertically operating guide supports for the folded carton, combined feeding and compression rolls, mechanism for advancing a folded carton into the bite of said rolls.

3. In a machine of the character described, carton folding mechanism comprising rock shafts carrying alternately operating side and end folders, feed and compression rolls in advance of the folding mechanism, mechanism for advancing a folded carton into said rolls comprising reciprocating slide carrying carton ejectors pivotally supported thereon, means for elevating said ejector to engage a carton on its forward movement, and means for depressing the ejector on its backward movement so as to clear the folders.

4. In a machine of the character described, carton folding mechanism, combined feed and compression rolls located in advance of the folding mechanism, a reciprocating ejector for delivering a folded carton to the rolls and a guide plate for closing a central portion of a folded flap of the carton and guiding it into the rolls.

5. In a machine of the character described, comprising, in combination, automatic mechanism adapted to effect a partial advance of a carton blank, automatically operating blank ejectors, carton folding mechanism adapted to receive a blank from the ejectors, automatically operating guides adapted to support a carton located under the folding mechanism and hold said carton firmly in place during a part of the folding operation, combined feed and compression rolls located in advance of the folding mechanism, reciprocating ejectors for advancing a folded blank to the rolls, and means for guiding the same into the rolls, stitching mechanism in advance of said rolls, intermediate mechanism for advancing a folded and compressed carton to the stitching mechanism, and independently operating mechanism for accurately locating the same with respect to the stitching mechanism.

In testimony whereof I affix my signature in presence of two witnesses.

REUBEN H. BROWN.

Witnesses:
J. B. COOK,
F. B. FARNSWORTH.